(12) United States Patent
Onomura et al.

(10) Patent No.: US 10,308,374 B2
(45) Date of Patent: *Jun. 4, 2019

(54) STEREO DISTANCE MEASURING APPARATUS, STEREO DISTANCE MEASURING METHOD, AND COMPUTER READABLE MEDIUM

(71) Applicant: SUBARU CORPORATION, Tokyo (JP)

(72) Inventors: Yoichi Onomura, Tokyo (JP); Akihiro Yamane, Tokyo (JP); Akitoshi Sakaguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/724,165

(22) Filed: Oct. 3, 2017

(65) Prior Publication Data

US 2018/0105286 A1 Apr. 19, 2018

(30) Foreign Application Priority Data

Oct. 19, 2016 (JP) ................................ 2016-204786

(51) Int. Cl.
*H04N 13/00* (2018.01)
*B64D 47/08* (2006.01)
(Continued)

(52) U.S. Cl.
CPC ............. *B64D 47/08* (2013.01); *B64D 45/08* (2013.01); *G01C 11/12* (2013.01); *H04N 3/155* (2013.01);
(Continued)

(58) Field of Classification Search
CPC .. H04N 13/246; H04N 13/106; H04N 13/296; H04N 13/239; H04N 3/155; B64D 47/08; G01S 19/48; G03B 37/04
See application file for complete search history.

(56) References Cited

U.S. PATENT DOCUMENTS 4,805,015 A * 2/1989 Copeland ................ G01S 13/89
348/48
2004/0174453 A1* 9/2004 Okada .................... B64D 47/08
348/333.06
(Continued)

FOREIGN PATENT DOCUMENTS

JP 4328551 B2 9/2009
JP 2018-095231 A 6/2018

OTHER PUBLICATIONS

Japanese Office Action issued in corresponding Japanese Patent Application No. 2016-204786, dated Sep. 25, 2018, with English Translation.

*Primary Examiner* — Ping Y Hsieh
(74) *Attorney, Agent, or Firm* — McDermott Will & Emery LLP

(57) ABSTRACT

A stereo distance measuring apparatus includes a first optical camera and a second optical camera, a position-posture calculator, an image corrector, and a stereo distance measuring unit. The first and second optical cameras are provided in an elastic structure part of an aircraft and separated from each other. The first and second optical cameras constitute a stereo camera. The position-posture calculator calculates, on the basis of a displacement amount of the elastic structure part, first and second position-posture information regarding positions and postures of the first and second optical cameras, respectively. The image corrector generates first and second corrected images by correcting, on the basis of the first and second position-posture informa- (Continued)

tion, positions and orientations of images taken by the first and second optical cameras, respectively. The stereo distance measuring unit calculates a distance to a photographing target, on the basis of the first and second corrected images.

11 Claims, 8 Drawing Sheets

(51) Int. Cl.
*H04N 13/246* (2018.01)
*H04N 13/296* (2018.01)
*H04N 3/14* (2006.01)
*B64D 45/08* (2006.01)
*H04N 13/254* (2018.01)
*H04N 13/204* (2018.01)
*G01C 11/12* (2006.01)
*G06F 16/00* (2019.01)

(52) U.S. Cl.
CPC ......... *H04N 13/204* (2018.05); *H04N 13/246* (2018.05); *H04N 13/254* (2018.05); *H04N 13/296* (2018.05); *G06F 16/00* (2019.01); *G06T 2207/10012* (2013.01); *H04N 2013/0081* (2013.01)

(56) References Cited

U.S. PATENT DOCUMENTS

| | | | |
|---|---|---|---|
| 2012/0038627 A1* | 2/2012 | Sung | G06T 7/0042 345/419 |
| 2012/0229628 A1* | 9/2012 | Ishiyama | H04N 5/23212 348/135 |
| 2013/0038692 A1* | 2/2013 | Ohtomo | G05D 1/0016 348/46 |
| 2013/0258066 A1* | 10/2013 | Asano | G03B 35/08 348/47 |
| 2015/0235427 A1* | 8/2015 | Nobori | G06T 19/006 345/629 |
| 2018/0091797 A1* | 3/2018 | Armatorio | H04N 13/239 |
| 2018/0105286 A1* | 4/2018 | Onomura | H04N 13/246 |
| 2018/0184077 A1* | 6/2018 | Kato | H04N 13/344 |

* cited by examiner

STEREO DISTANCE MEASURING APPARATUS, STEREO DISTANCE MEASURING METHOD, AND COMPUTER READABLE MEDIUM

CROSS-REFERENCE TO RELATED APPLICATIONS

The present application claims priority from Japanese Patent Application No. 2016-204786 filed on Oct. 19, 2016, the entire contents of which are hereby incorporated by reference.

BACKGROUND

The technology relates to a stereo distance measuring apparatus that measures a distance utilizing a stereo camera mounted on an aircraft, a stereo distance measuring method, and a computer readable medium having a stereo distance measuring program.

Aircrafts generally utilize radar mounted on their airframes, in a measurement of a distance from the own aircraft to a predetermined target. Distance measuring apparatuses that send out radio waves, e.g., the radar, however, have an issue that a position of the own aircraft may be detected by others.

For example, Japanese Patent (JP-B2) No. 4328551 makes a proposal for a distance measuring technique utilizing a stereo camera mounted on an airframe. This technique does not involve sending out the radio waves. In addition, this technique makes it possible to acquire image information.

Moreover, the technique described in JP-B2 No. 4,328,551 includes detecting posture information of the airframe, and controlling a posture of the stereo camera utilizing the posture information. This makes it possible to acquire images in a constant orientation, regardless of a posture of the airframe.

SUMMARY

In such a stereo distance measuring apparatus that measures a distance utilizing a stereo camera, high measurement precision is desired, with expectation of further enhancement in the measurement precision.

It is desirable to provide a stereo distance measuring apparatus, a stereo distance measuring method, and a computer readable medium having a stereo distance measuring program that make it possible to enhance measurement precision.

An aspect of the technology provides a stereo distance measuring apparatus including a first optical camera and a second optical camera, a position-posture calculator, an image corrector, and a stereo distance measuring unit. The first optical camera and the second optical camera are provided in an elastic structure part of an aircraft and separated from each other. The first optical camera and the second optical camera constitute a stereo camera. The position-posture calculator is configured to calculate, on the basis of a displacement amount of the elastic structure part, first position-posture information regarding a position and a posture of the first optical camera and second position-posture information regarding a position and a posture of the second optical camera. The image corrector is configured to generate a first corrected image by correcting, on the basis of the first position-posture information, a position and an orientation of an image taken by the first optical camera, and generates a second corrected image by correcting, on the basis of the second position-posture information, a position and an orientation of an image taken by the second optical camera. The stereo distance measuring unit is configured to calculate a distance to a photographing target, on the basis of the first corrected image and the second corrected image.

An aspect of the technology provides a stereo distance measuring method including: calculating, with a stereo distance measuring apparatus including a first optical camera and a second optical camera that are provided in an elastic structure part of an aircraft and separated from each other, first position-posture information regarding a position and a posture of the first optical camera and second position-posture information regarding a position and a posture of the second optical camera, on the basis of a displacement amount of the elastic structure part, the first optical camera and the second optical camera constituting a stereo camera; generating, with the stereo distance measuring apparatus, a first corrected image by correcting, on the basis of the first position-posture information, a position and an orientation of an image taken by the first optical camera, and a second corrected image by correcting, on the basis of the second position-posture information, a position and an orientation of an image taken by the second optical camera; and calculating, with the stereo distance measuring apparatus, a distance to a photographing target, on the basis of the first corrected image and the second corrected image.

An aspect of the technology provides a non-transitory computer readable medium having a stereo distance measuring program causing a computer to implement a method. The method includes: calculating, with a stereo distance measuring apparatus including a first optical camera and a second optical camera that are provided in an elastic structure part of an aircraft and separated from each other, first position-posture information regarding a position and a posture of the first optical camera and second position-posture information regarding a position and a posture of the second optical camera, on the basis of a displacement amount of the elastic structure part, the first optical camera and the second optical camera constituting a stereo camera; generating, with the stereo distance measuring apparatus, a first corrected image by correcting, on the basis of the first position-posture information, a position and an orientation of an image taken by the first optical camera, and a second corrected image by correcting, on the basis of the second position-posture information, a position and an orientation of an image taken by the second optical camera; and calculating, with the stereo distance measuring apparatus, a distance to a photographing target, on the basis of the first corrected image and the second corrected image.

An aspect of the technology provides a stereo distance measuring apparatus including a first optical camera and a second optical camera, a distance measuring unit, and circuitry. The first optical camera and a second optical camera are provided in an elastic structure part of an aircraft and separated from each other. The first optical camera and the second optical camera constitute a stereo camera. The distance measuring unit is provided in a highly-rigid part of the aircraft, and configured to measure a distance and a direction from the highly-rigid part to the first optical camera and a distance and a direction from the highly-rigid part to the second optical camera. The highly-rigid part has rigidity that is higher than rigidity of the elastic structure part. The circuitry is configured to calculate, on the basis of the distance and the direction from the highly-rigid part to the first optical camera, first position-posture information regarding a position and a posture of the first optical camera, and calculates, on the basis of the distance and the direction from the highly-rigid part to the second optical camera, second position-posture information regarding a position and a posture of the second optical camera. The circuitry is configured to generate a first corrected image by correcting, on the basis of the first position-posture information, a position and an orientation of an image taken by the first optical camera, and generates a second corrected image by correcting, on the basis of the second position-posture information, a position and an orientation of an image taken by the second optical camera. The circuitry is configured to calculate a distance to a photographing target, on the basis of the first corrected image and the second corrected image.

An aspect of the technology provides a stereo distance measuring apparatus including a first optical camera and a second optical camera, a displacement amount measuring unit, and circuitry. The first optical camera and a second optical camera are provided in an elastic structure part of an aircraft and separated from each other. The first optical camera and the second optical camera constitute a stereo camera. The displacement amount measuring unit is configured to measure a first displacement amount of the elastic structure part at a position, in the elastic structure part, at which the first optical camera is provided, and measures a second displacement amount of the elastic structure part at a position, in the elastic structure part, at which the second optical camera is provided. The circuitry is configured to calculate, on the basis of the first displacement amount, first position-posture information regarding a position and a posture of the first optical camera, and calculate, on the basis of the second displacement amount, second position-posture information regarding a position and a posture of the second optical camera. The circuitry is configured to generate a first corrected image by correcting, on the basis of the first position-posture information, a position and an orientation of an image taken by the first optical camera, and generate a second corrected image by correcting, on the basis of the second position-posture information, a position and an orientation of an image taken by the second optical camera. The circuitry is configured to calculate a distance to a photographing target, on the basis of the first corrected image and the second corrected image.

DETAILED DESCRIPTION

Figure 1:
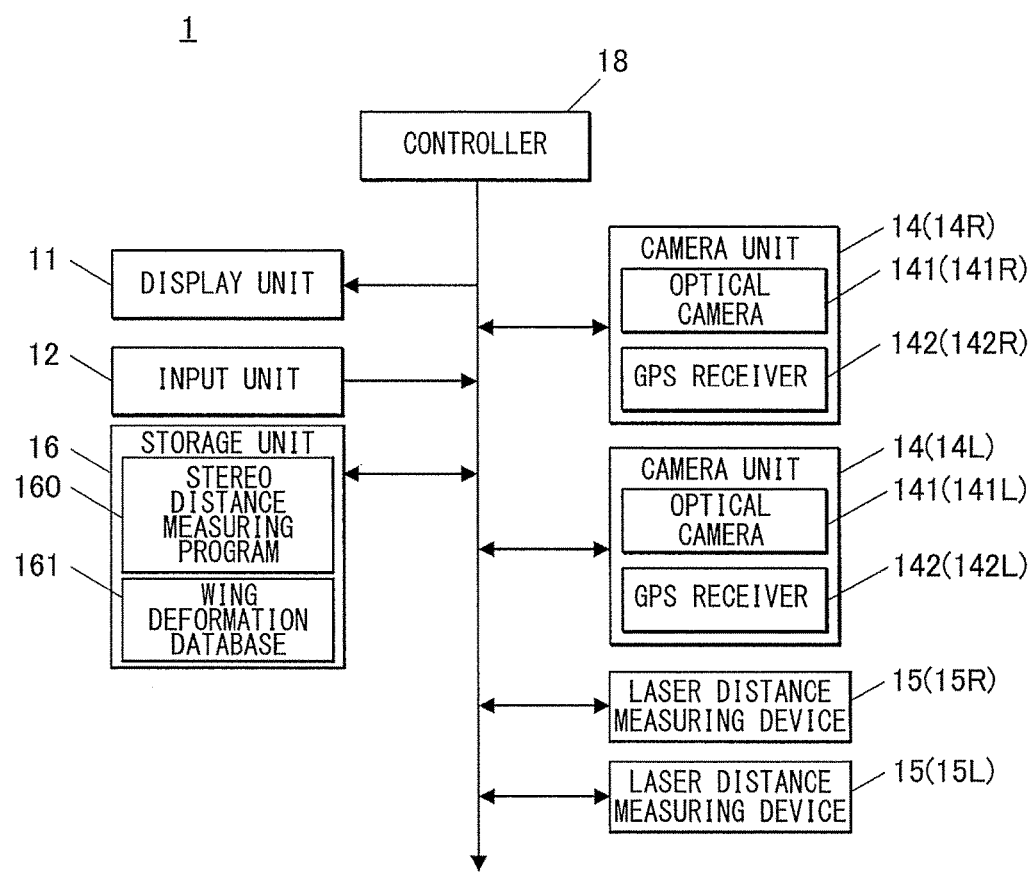
FIG. 1 is a block diagram illustrating an example of a functional configuration of a stereo distance measuring apparatus according to a first implementation of the technology.
Figure 2:
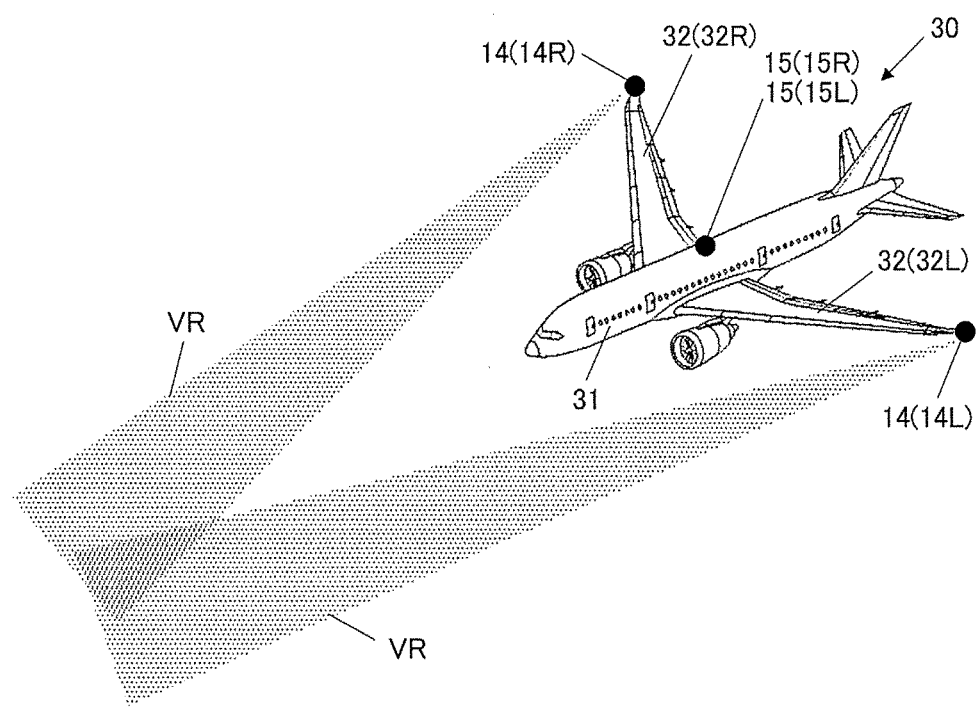
FIG. 2 describes examples of a camera unit and a laser distance measuring device provided in the stereo distance measuring apparatus according to the first implementation.

In the following, some implementations of the technology are described with reference to the drawings.
[First Implementation]
A first implementation of the technology is described first.
[Configuration of Stereo Distance Measuring Apparatus 1]
FIG. 1 is a block diagram illustrating a functional configuration of a stereo distance measuring apparatus 1 according to the first implementation of the technology. FIG. 2 describes a camera unit 14 and a laser distance measuring device 15 both provided in the stereo distance measuring apparatus 1, which will be described later.

The stereo distance measuring apparatus 1 may be mounted on, for example but not limited to, an aircraft 30, e.g., a fixed wing aircraft. The stereo distance measuring apparatus 1 may measure a distance from the aircraft 30 to a photographing target, on the basis of a stereo image acquired.

In one specific but non-limiting example, referring to FIGS. 1 and 2, the stereo distance measuring apparatus 1 may include a display unit 11, an input unit 12, two camera units 14, two laser distance measuring devices 15, a storage unit 16, and a controller 18.

The display unit 11 may include an unillustrated display. The display unit 11 may display various pieces of information on the display, on the basis of a display signal inputted from the controller 18.

The input unit 12 may include unillustrated input receiving instrumentation. The input unit 12 may supply the controller 18 with a signal corresponding to an input operation made by an operator on the input receiving instrumentation.

The two camera units 14 may acquire a stereo image outside the aircraft 30. As illustrated in FIG. 2, the two camera units 14 may be disposed separately at respective tips of both wings 32, specifically, a right wing 32R and a left wing 32L, of the aircraft 30, and widely separated from each other. The wings 32, specifically, the right wing 32R and the left wing 32L may be an elastic structure part of the aircraft 30.

As illustrated in FIG. 1, each of the camera units 14 may include an optical camera 141 and a global positioning system (GPS) receiver 142.

It is to be noted that, in the following description, the reference characters of the camera unit 14 mounted on the right wing 32R of the aircraft 30 and the parts of the relevant camera unit 14 are followed by "R", while the reference characters of the camera unit 14 mounted on the left wing 32L and the parts of the relevant camera unit 14 are followed by "L", in order to distinguish one from the other.

The optical camera 141 may acquire, on the basis of a control instruction from the controller 18, an image outside the aircraft 30, and supply the controller 18 with image information acquired. The optical camera 141 may be provided in each of the two camera units 14. Thus, the two optical cameras 141 may constitute a pair and function as a stereo camera. As illustrated in FIG. 2, the optical cameras 141 may be separated away from each other at a predetermined distance, with their visual fields or ranges VR overlapping with each other so as to be able to acquire the stereo image.

The GPS receiver 142 may acquire photographing time of images taken by the associated optical camera 141 of the same camera unit 14, in this implementation. The GPS receiver 142 may receive, on the basis of a control instruction from the controller 18, a GPS signal including GPS time information from a GPS satellite, and supply the GPS signal to the controller 18.

The two laser distance measuring devices 15 may acquire position-posture information, i.e., information regarding positions and postures (i.e., orientations) of the pair of optical cameras 141. The laser distance measuring devices 15 may be provided in a body 31, of the aircraft 30, that has rigidity higher than rigidity of the wings 32. In one specific but non-limiting example, the two laser distance measuring devices 15 may be provided at the top of the substantial middle of the body 31, in a front-rear direction of the airframe, in which base ends of both the wings 32 are located.

Figure 4:
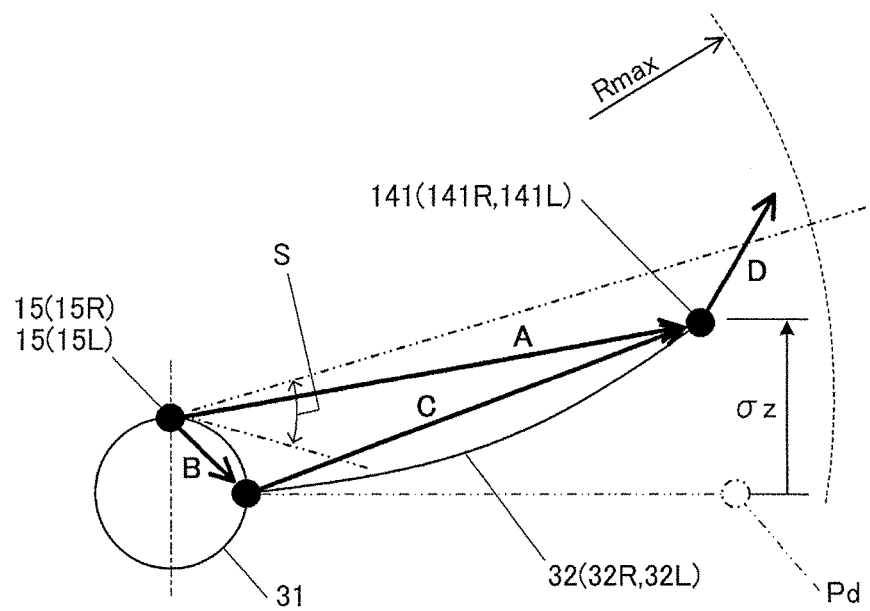
FIG. 4 is a conceptual diagram describing an example of a procedure of calculating positions and postures of the respective optical cameras in the stereo distance measuring process according to the first implementation.

Each of the two laser distance measuring devices 15 may be associated with one of the two camera units 14, specifically, one of the two optical cameras 141. Each of the two laser distance measuring devices 15 may have a light reception-emission surface (i.e., a measuring surface) that is oriented to a side region of the airframe, i.e., outside of the aircraft 30, and thus allow the associated optical camera 141 to be present in a measuring range of the relevant laser distance measuring device 15. The light reception-emission surfaces or the measuring surfaces of the respective two laser distance measuring devices 15 may be oriented in directions opposite to each other. In one specific but non-limiting example, to address deformation of the wings 32 of the aircraft 30 in flight, the laser distance measuring devices 15 may be so provided that the laser distance measuring devices 15 allow the optical cameras 141 provided at the respective tips of the wings 32 to be present in scanning ranges S or the measuring ranges of the laser distance measuring devices 15 when the wings 32 are deformed, as illustrated in FIG. 4. Non-limiting example of the deformation of the wings 32 of the aircraft 30 in flight may include upward warp of the wings 32. Each of the laser distance measuring devices 15 may measure, on the basis of a control instruction from the controller 18, a distance and a direction or an angle from a position at which the relevant laser distance measuring device 15 is disposed to the tip of the wing 32 provided with the associated optical camera 141, and supply the controller 18 with the distance and the direction (i.e., the angle) measured.

It is to be noted that, in the following description, the reference character of the laser distance measuring device 15 associated with the optical camera 141R mounted on the right wing 32R is followed by "R", the reference character of the laser distance measuring device 15 associated with the optical camera 141L mounted on the left wing 32L is followed by "L", in order to distinguish one from the other.

As illustrated in FIG. 1, the storage unit 16 may be a memory that stores programs and data to achieve various functions of the stereo distance measuring apparatus 1 and also serves as a work area. In this implementation, the storage unit 16 may store a stereo distance measuring program 160 and a wing deformation database 161.

The stereo distance measuring program 160 may be a program that causes the controller 18 to execute a stereo distance measuring process described later.

The wing deformation database 161 may be a database that describes a relationship of a displacement amount (i.e., a warp amount) σz of the tip of each of the wings 32 in a wing thickness direction, i.e., a position at which the associated optical camera 141 is disposed, versus an angle (i.e., an orientation) of the tip of the relevant wing 32, illustrated in FIG. 4. The wing thickness direction may be a top-bottom direction of the airframe.

In this implementation, the wing deformation database 161 may be used; however, this is non-limiting. As long as the relationship between the displacement amount σz of the tip of each of the wings 32 and the angle of the tip of the relevant wing 32 is expressed, the relationship is not necessarily expressed in a database format. In one specific but non-limiting example, a relational expression that expresses the relationship between the displacement amount σz of the tip of each of the wings 32 and the angle at the tip of the relevant wing 32 may be used instead of the wing deformation database 161.

The controller 18 may be provided in the body 31 of the aircraft 30. The controller 18 may execute, on the basis of an instruction inputted, a process based on a predetermined program, give instructions to each functional part or perform data transfer to each functional part, and perform a general control of the stereo distance measuring apparatus 1. In one specific but non-limiting example, the controller 18 may read, in response to a signal such as an operation signal inputted from the input unit 12, various programs stored in the storage unit 16, and execute processes in accordance with the programs. The controller 18 may temporarily store results of the processes in the storage unit 16, and output the results of the processes to the display unit 11 as appropriate.

[Operation of Stereo Distance Measuring Apparatus 1]

A description is given next of an operation of the stereo distance measuring apparatus 1 upon execution of the stereo distance measuring process.

Figure 3A:
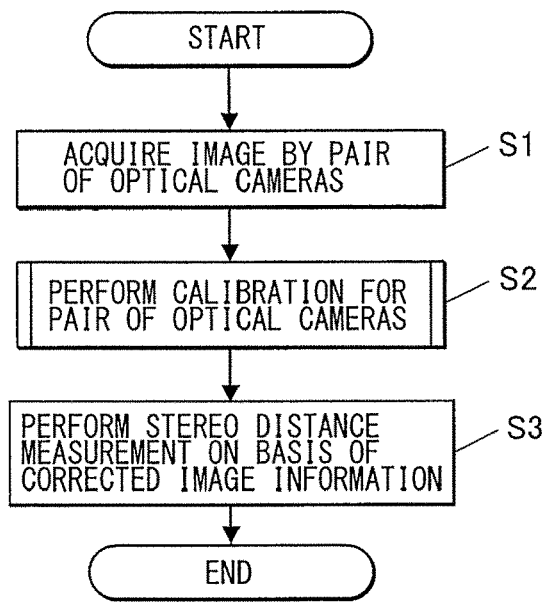
FIG. 3A is a flowchart illustrating an example of a flow of a stereo distance measuring process according to the first implementation.
Figure 3B:
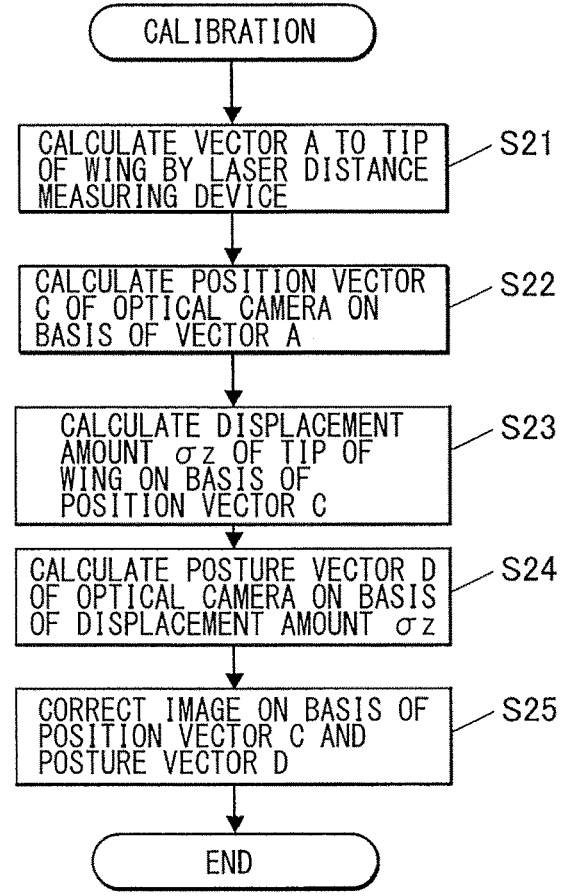
FIG. 3B is a flowchart illustrating an example of a flow of calibration for optical cameras in the stereo distance measuring process according to the first implementation.
Figure 5A:
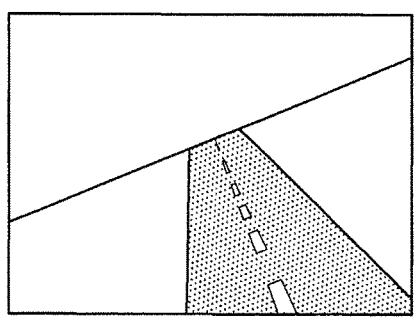
FIGS. 5A and 5B are conceptual diagrams describing an example of a change in image before and after correction performed in the stereo distance measuring process.
Figure 5B:
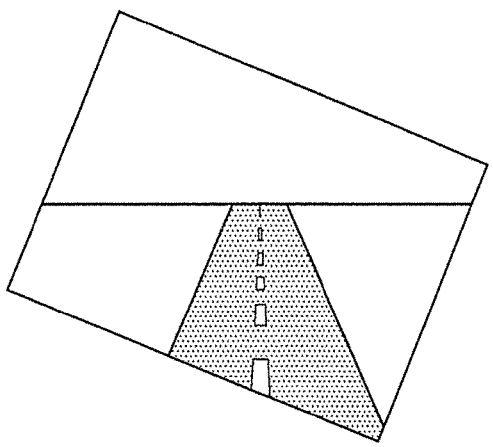

FIG. 3A is a flowchart illustrating a flow of the stereo distance measuring process according to the first implementation. FIG. 3B is a flowchart illustrating a flow of calibration for each of the optical cameras 141 included in the stereo distance measuring process, which will be described later. FIG. 4 is a conceptual diagram describing a procedure of calculating positions and postures of the respective optical cameras 141 in the stereo distance measuring process according to the first implementation, specifically, the calibration for the respective optical cameras 141. FIGS. 5A and 5B are conceptual diagrams describing a change in image before and after correction performed in the stereo distance measuring process.

It is to be noted that FIG. 4 illustrates only components related to one of the pair of optical cameras 141, and omits illustration of components related to the other.

The stereo distance measuring process may be a process that includes acquiring the stereo image with the pair of optical cameras 141, and calculating, on the basis of the stereo image, the distance from the aircraft 30 to the photographing target. Upon an input of an instruction to execute the process by, for example, an operation by an operator, the controller 18 may read the stereo distance measuring program 160 from the storage unit 16 and develop the stereo distance measuring program 160, to execute the stereo distance measuring process.

It is to be noted that it is assumed for this implementation that the photographing target, i.e., a target of a distance measurement, is on the ground below the airframe, and the photographing target is photographed from the aircraft 30 in flight. However, a location of the photographing target is not limited thereto. In one specific but non-limiting example, the photographing target may be level with or above the aircraft 30 in flight, or alternatively, the photographing target may be at the sea or in the air.

As illustrated in FIG. 3A, upon the execution of the stereo distance measuring process, the controller 18 may, first, allow each of the pair of optical cameras 141 on the respective right and left wings 32 to acquire image information that represents an image outside the aircraft 30 (step S1). The image outside the aircraft 30 may be either a still image or a moving image. At this occasion, in each of the camera units 14, GPS time information acquired by the GPS receiver 142 may be associated with the image information taken by the associated optical camera 141, and outputted to the controller 18.

Thereafter, the controller 18 may perform calibration for the pair of optical cameras 141, i.e., correct a pair of pieces of image information taken by the pair of optical cameras 141 (step S2).

In the aircraft 30 in flight, both of the wings 32 of the airframe may be so deformed as to warp upward. This deformation may cause a change in relative positions and postures of the two camera units 14R and 14L disposed at the respective tips of both the wings 32 from a designed state. Therefore, simply utilizing the stereo image obtained by the pair of optical cameras 141 in the deformation state may become a hindrance to a precise measurement of the distance to the photographing target.

To address this, in step S2, the pair of pieces of image information taken by the pair of optical cameras 141 may be corrected separately from each other, on the basis of the position-posture information, i.e., the information regarding the positions and the postures, of the pair of optical cameras 141.

In one specific but non-limiting example, the calibration may be performed as follows. Referring to FIGS. 3B and 4, the controller 18 may first calculate a vector A from the position at which each of the laser distance measuring devices 15 is disposed to the tip of the associated wing 32, i.e., to the position at which the associated optical camera 141 is disposed (step S21). The calculation of the vector A may be performed for both of the wings 32, i.e., the right wing 32R and the left wing 32L.

In step S21, the controller 18 may calculate each of the vectors A by causing associated one of the laser distance measuring devices 15 to measure a distance and a direction or an angle from the position at which the associated laser distance measuring device 15 is disposed to the associated optical camera 141. For the vector calculation, an assumed maximum distance Rmax from each of the laser distance measuring devices 15 to the associated optical camera 141 may be set in advance. The controller 18 may calculate, as the vector A, a maximum vector within a size range that is equal to or smaller than the assumed maximum distance Rmax. This prevents an error in measurement. Non-limiting examples of the error in measurement may include erroneously detecting that a position of an end of the vector A is located at a position that is farther than the end of the wing 32 in the side region of the airframe.

Thereafter, the controller 18 may calculate, as a position vector C of each of the optical cameras 141, a vector from the base end to the tip of the associated wing 32 (step S22). The calculation of the vector C may be performed for both of the wings 32.

In step S22, the controller 18 may calculate the position vector C of each of the optical cameras 141 on the basis of the vector A calculated in step S22 and a vector B. The vector B may be a vector from the position at which the associated laser distance measuring device 15 is disposed to the base end of the associated wing 32. In this implementation, the vector B is a value known as a design value or a drawing value.

Thereafter, the controller 18 may calculate the displacement amount σz or a warp amount of the tip of each of the two wings 32 from a designed position Pd in the wing thickness direction, on the basis of the position vector C calculated in step S22 (step S23). The calculation of the displacement amount σz may be performed for both of the wings 32. In this implementation, the designed position Pd may be a position at which the tip of the relevant wing 32 is located in the designed state, and a position of the tip of the relevant wing 32 in a state where the relevant wing 32 is not displaced.

Thereafter, the controller 18 may calculate, as a posture vector D of each of the optical cameras 141, an angle (i.e., an orientation) of the tip of the associated wing 32 (step S24). The calculation of the posture vector D may be performed for both of the wings 32.

In step S24, the controller 18 may calculate the angle of the tip of each of the wings 32, i.e., the posture vector D of the associated optical camera 141, on the basis of the displacement amount σz of the tip of the associated wing 32 calculated in step S23 and the wing deformation database 161 read from the storage unit 16.

Thereafter, the controller 18 may correct the image information acquired in step S1, on the basis of the position vectors C of the respective optical cameras 141 calculated in step S22 and the posture vectors D of the respective optical cameras 141 calculated in step S24 (step S25).

In one specific but non-limiting example, the controller 18 may calculate a change in position of each of the optical cameras 141 from the designed state, on the basis of the position vector C of the relevant optical camera 141. Further, the controller 18 may calculate a change in posture of each of the optical cameras 141 from the designed state, on the basis of the posture vector D of the relevant optical camera 141. Further, the controller 18 may correct a position and a posture of an image in the image information taken by the relevant optical camera 141 by the calculated amount of change in position and by the calculated amount of change in posture of the relevant optical camera 141, respectively. The controller 18 may thereby acquire corrected image information.

As illustrated in FIGS. 5A and 5B, this may correct the image taken by each of the optical cameras 141 whose position and posture are changed from those in the designed state to be an image that should have been taken by the relevant optical camera 141 in the designed state.

Thereafter, as illustrated in FIG. 3A, the controller 18 may utilize, as the stereo image, the pair of pieces of the corrected image information thus acquired, and calculate the distance to the photographing target (step S3). At this occasion, the controller 18 may refer to the GPS time information associated with each piece of the corrected image information, and select a pair of pieces of corrected image information whose timing of imaging coincide with each other. The situation where "the timing of the imaging coincide with each other" may encompass a situation where a time difference between points in time indicated by the two pieces of the GPS time information falls within a range in which the points in time are regarded as the same point in time. The controller 18 may collate the pair of pieces of the corrected image information, to calculate the distance.

In this way, the distance from the aircraft 30 to the photographing target is appropriately measured, with the stereo image based on the pair of pieces of the corrected image information whose timing of the imaging coincide with each other and in which the changes in the positions and the postures of the respective optical cameras 141 in flight are corrected.

In this connection, in applications of distance measurements utilizing a stereo camera mounted on an aircraft, distances to be measured are far longer than those in, for example, general applications such as monitoring applications on the ground. It is therefore desirable to also provide a large baseline length or a large visual axis interval between two cameras that constitute the stereo camera in the application of distance measurement from an aircraft.

However, with the two cameras separated apart from each other, it is generally difficult to support the two cameras integrally with high rigidity. For example, a possible method to space the two cameras as apart as possible from each other on a fixed wing aircraft may be to dispose the two cameras on respective two wings of an airframe. However, wings of an aircraft are deformed, or warp, in accordance with forces such as lift, and therefore fail in keeping relative states, e.g., positions and postures, of the two cameras constant.

As a result, the two cameras change in their relative positions and postures in accordance with flight states of the airframe. This results in lowered measurement precision as the stereo camera. Performing a posture control of the two cameras as in the technique described in JP-B2 4328551 is promising; however, it is still difficult to appropriately perform the posture control of the two cameras of different positions and postures with utilization of the posture information of the airframe that is common to the two cameras.

Directly acquiring information regarding the positions and the postures of the two cameras with utilization of a position-posture meter is also promising; however, a position-posture meter with high accuracy costs much, which increases a cost of the apparatus.

To address this, in the stereo distance measuring apparatus 1, the pair of laser distance measuring devices 15 are utilized to calculate respective pieces of the position-posture information, i.e., the position vectors C and the posture vectors D, of the optical cameras 141, on the basis of the displacement amounts of the wings 32. On the basis of the two pieces of the position-posture information thus calculated, the respective positions and the respective orientations of the images in the pair of pieces of image information taken by the pair of optical cameras 141 are corrected. On the basis of the corrected pieces of image information, i.e., the two pieces of corrected image information, the distance from the aircraft 30 to the photographing target is obtained. This makes it possible for the stereo distance measuring apparatus 1 to obtain the distance on the basis of the corrected image information in which the positions and the orientations of the images are corrected, even in a case where the pair of optical cameras 141 have changed in the respective positions and the postures, due to the modification of the wings 32 of the aircraft 30 in accordance with forces such as lift. Hence, it is possible to enhance the measurement precision.

In particular, in the stereo distance measuring apparatus 1, the pair of laser distance measuring devices 15 are utilized to calculate the respective pieces of position-posture information of the optical cameras 141 on the basis of the displacement amounts of the wings 32. Therefore, it is possible to calculate the respective pieces of position-posture information of the optical cameras 141 without using an expensive position-posture meter.

[Effects]

As described, according to the first implementation, the images in the pair of pieces of image information taken by the pair of the optical cameras 141 configuring the stereo camera are separately corrected in position and orientation, on the basis of the two pieces of position-posture information, i.e., the position vectors C and the posture vectors D, of the respective optical cameras 141. The two pieces of position-posture information, i.e., the position vectors C and the posture vectors D, of the respective optical cameras 141 are calculated on the basis of the displacement amounts of the two wings 32 on which the pair of optical cameras 141 are disposed. On the basis of the pair of pieces of the corrected image information thus corrected, the distance to the photographing target is calculated.

Accordingly, it is possible to appropriately correct the positions and the orientations of the images, even in a case where the pair of optical cameras 141 are mounted on the aircraft and separated from each other, and the positions and the postures of the optical cameras 141 have changed to different states from one another. Hence, it is possible to restrain the measurement precision from being lowered. Further, it is possible to calculate the position-posture information of the respective optical cameras 141 on the basis of the displacement amounts of the wings 32, without necessity of utilizing the expensive position-posture meter.

Hence, it is possible to enhance the measurement precision of the stereo camera mounted on the aircraft 30 in an inexpensive configuration, as compared to a case where the position-posture meter is utilized.

Moreover, each piece of the image information taken by the pair of the optical cameras 141 may be associated with the GPS time information. On the basis of the GPS time information, the pair of pieces of the corrected image information whose timing of the imaging coincide with each other may be selected to calculate the distance to the photographing target.

Accordingly, it is possible to suitably restrain the shift in the timing of the imaging that is likely to occur because of the extension of the signal transmission paths and the manufacturing tolerances of the wiring lengths in the case with the pair of the optical cameras 141 separated apart from each other. Hence, it is possible to restrain the measurement precision from being lowered.

[Second Implementation]

A second implementation of the technology is described next. It is to be noted that components similar to those in the foregoing first implementation are denoted with the same numerals, and will not be further described.

[Configuration of Stereo Distance Measuring Apparatus 2]

Figure 6:
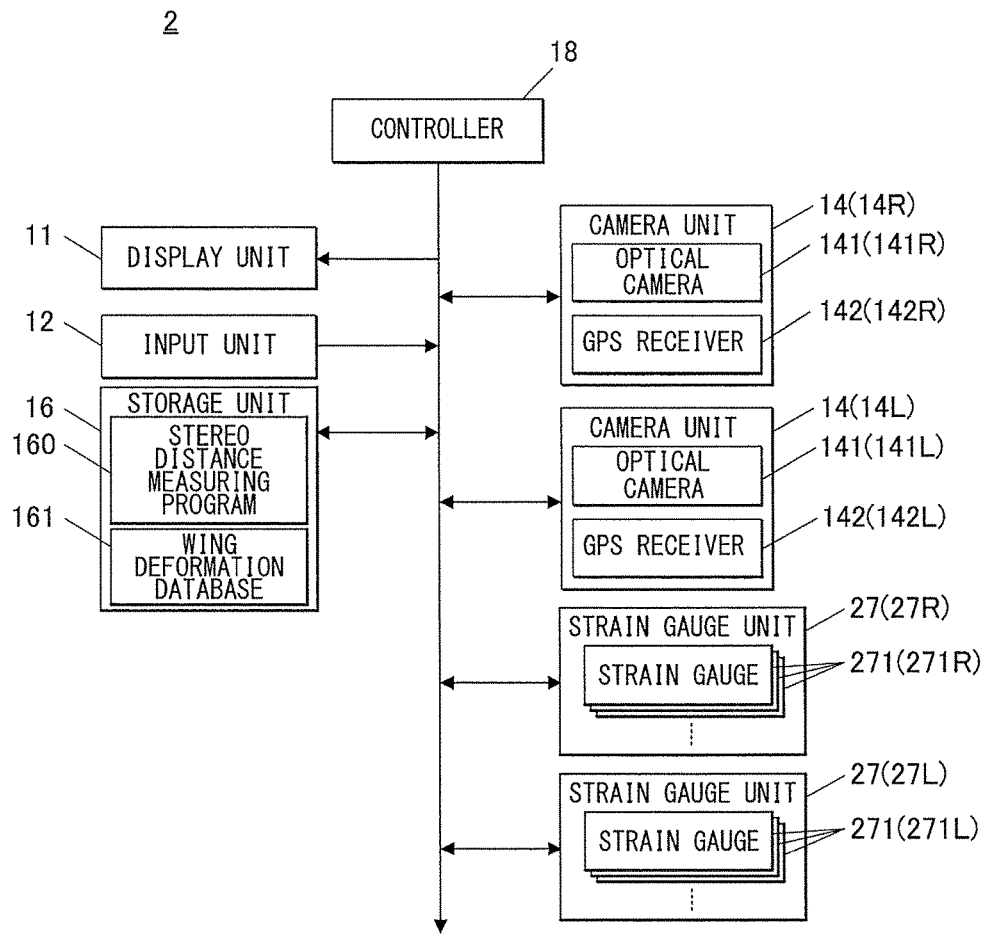
FIG. 6 is a block diagram illustrating an example of a functional configuration of a stereo distance measuring apparatus according to a second implementation of the technology.
Figure 7:
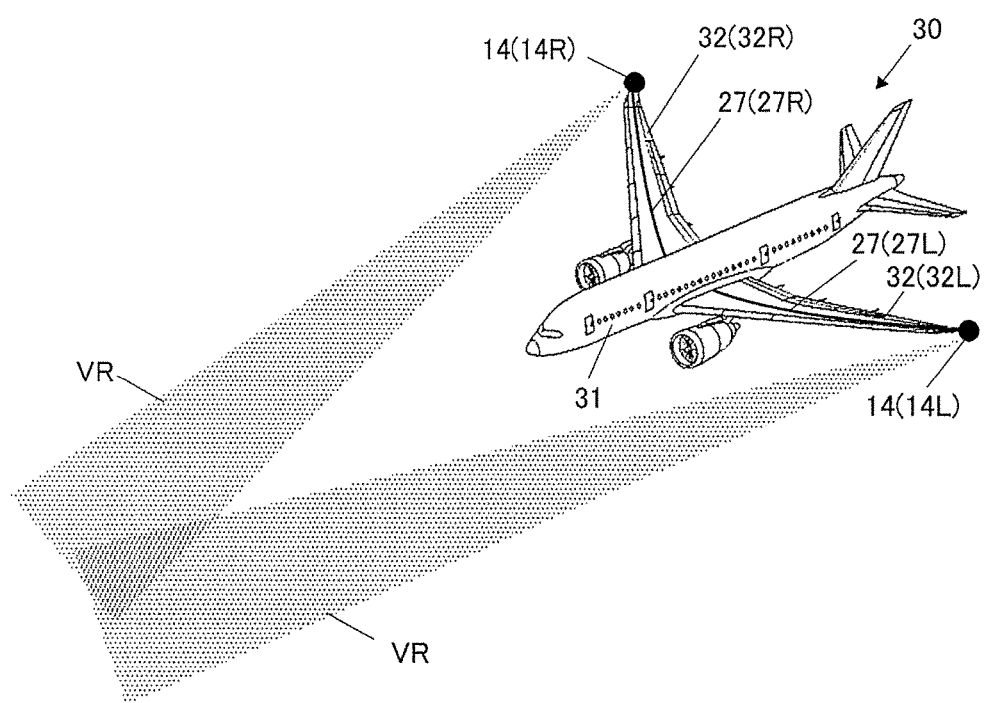
FIG. 7 describes examples of a camera unit and a strain gauge provided in the stereo distance measuring apparatus according to the second implementation.

FIG. 6 is a block diagram illustrating a functional configuration of a stereo distance measuring apparatus 2 according to the second implementation of the technology. FIG. 7 describes a strain gauge unit 27 provided in the stereo distance measuring apparatus 2, which will be described later.

The stereo distance measuring apparatus 2 may differ from the stereo distance measuring apparatus 1 according to the foregoing first implementation in that the position-posture information of the respective optical cameras 141 is obtained by using a strain gauge instead of the laser distance measuring device.

In one specific but non-limiting example, referring to FIGS. 6 and 7, the stereo distance measuring apparatus 2 may include two strain gauge units 27 instead of the two laser distance measuring devices 15 according to the foregoing first implementation.

The two strain gauge units 27 may acquire the position-posture information of the pair of optical cameras 141. The strain gauge units 27 may be disposed separately on the respective two wings 32 of the aircraft 30. Each of the strain gauge units 27 may include a plurality of strain gauges 271. The plurality of strain gauges 271 may be continuously provided in a span direction (i.e., a wing length direction) from the base end of the associated wing 32 to the tip, of the associated wing 32, at which the optical camera 141 is disposed. Further, the strain gauges 271 may be also attached onto an upper surface of the associated wing 32 so that the respective strain gauges 271 are able to measure bending strain and axial strain at positions to which the respective strain gauges 271 are attached. Each of the strain gauge units 27 may supply, via a component such as an unillustrated bridge circuit, the controller 18 with the displacement amounts, of the associated wing 32, at the positions to which the respective strain gauges 271 are attached.

It is to be noted that, in the following description, the reference character of the strain gauge unit 27 disposed on the right wing 32R is followed by "R", and the reference character of the strain gauge unit 27 disposed on the left wing 32L is followed by "L", in order to distinguish one from the other.

[Operation of Stereo Distance Measuring Apparatus 2]

A description is given next of an operation of the stereo distance measuring apparatus 2 upon execution of the stereo distance measuring process.

Figure 8A:
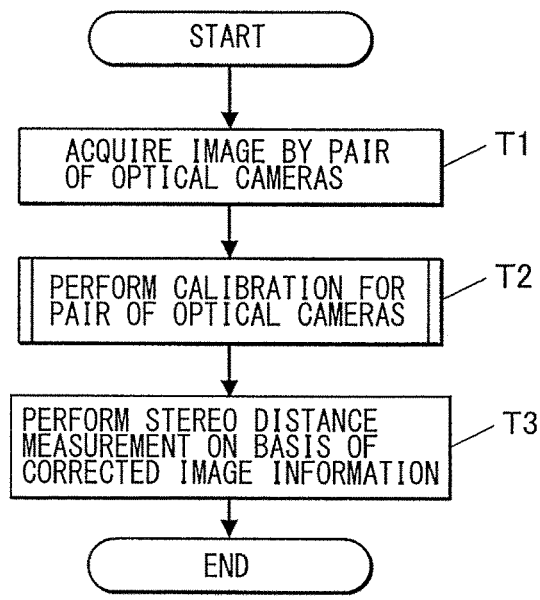
FIG. 8A is a flowchart illustrating an example of a flow of a stereo distance measuring process according to the second implementation.
Figure 8B:
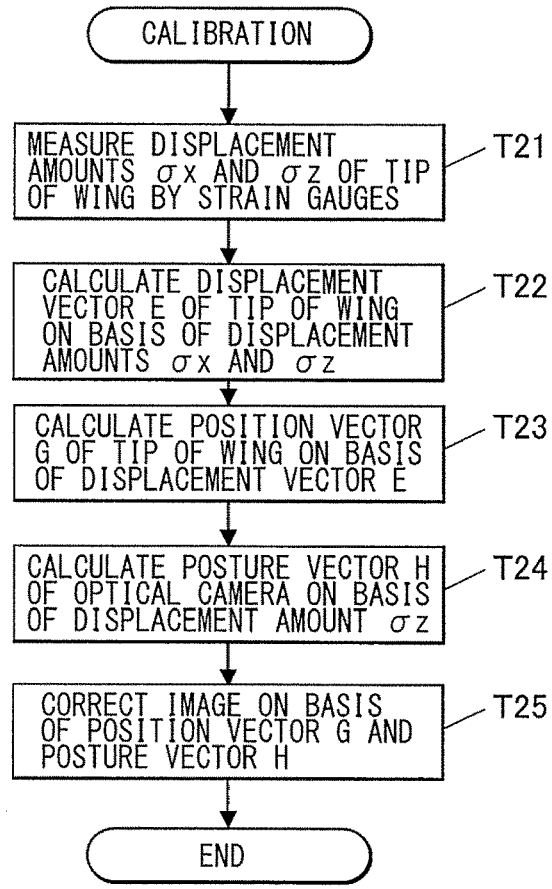
FIG. 8B is a flowchart illustrating an example of a flow of calibration for optical cameras in the stereo distance measuring process according to the second implementation.
Figure 9:
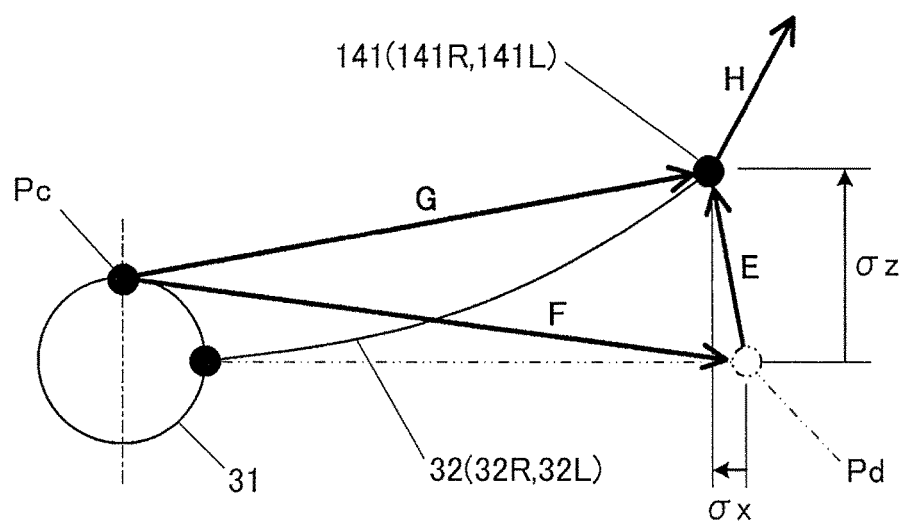
FIG. 9 is a conceptual diagram describing an example of a procedure of calculating positions and postures of the respective optical cameras in the stereo distance measuring process according to the second implementation.

FIG. 8A is a flowchart illustrating a flow of the stereo distance measuring process according to the second implementation. FIG. 8B is a flowchart illustrating a flow of calibration for each of the optical cameras 141 included in the stereo distance measuring process. FIG. 9 is a conceptual diagram describing a procedure of calculating positions and postures of the respective optical cameras 141 in the stereo distance measuring process according to the second implementation, specifically, the calibration for the respective optical cameras 141.

It is to be noted that FIG. 9 illustrates only components related to one of the pair of optical cameras 141, and omits illustration of components related to the other.

As illustrated in FIG. 8A, upon the execution of the stereo distance measuring process, the controller 18 may, first, allow each of the pair of optical cameras 141 on the respective right and left wings 32 to acquire image information that represents an image outside the aircraft 30, as in the foregoing first implementation (step T1). At this occasion, in each of the camera units 14, GPS time information acquired by the GPS receiver 142 may be associated with the image information taken by the associated optical camera 141, and outputted to the controller 18.

Thereafter, the controller 18 may perform calibration for the pair of optical cameras 141, i.e., correct a pair of pieces of image information taken by the pair of optical cameras 141 (step T2).

In one specific but non-limiting example, as illustrated in FIGS. 8B and 9, in the calibration, the controller 18 may first cause each of the strain gauge units 27 to measure a displacement amount $\sigma x$ of the tip of the relevant wing 32, i.e., the position at which the associated optical camera 141 is disposed, from the designed position Pd in the span direction, and a displacement amount $\sigma z$ of the tip of the relevant wing 32, i.e., the position at which the associated optical camera 141 is disposed, from the designed position Pd in the wing thickness direction (step T21). The measurement of the displacement amount $\sigma x$ and the displacement amount $\sigma z$ may be performed for both of the wings 32, i.e. the right wing 32R and the left wing 32L.

In step T21, the controller 18 may calculate the displacement amounts $\sigma x$ and $\sigma z$ of the tip of each of the wings 32 by integrating the displacement amounts measured by the plurality of strain gauges 271 constituting the associated strain gauge units 27.

Thereafter, the controller 18 may calculate a displacement vector E of the tip of each of the wings 32 from the designed position Pd, on the basis of the displacement amounts $\sigma x$ and $\sigma z$ measured in step T21 (step T22). The calculation of the displacement vector E may be performed for both of the wings 32.

Thereafter, the controller 18 may calculate, as a position vector G of each of the optical cameras 141, a vector from a reference position Pc on the body 31 to the tip of the associated wing 32 (step T23). The calculation of the position vector G may be performed for both of the wings 32.

In step T23, the controller 18 may calculate the position vector G of each of the optical cameras 141 on the basis of the displacement vector E of the tip of the associated wing 32 calculated in step T22 and a vector F. The vector F may be a vector from the reference position Pc to the designed position Pd of the tip of the associated wing 32. In one specific but non-limiting example, the reference position Pc may be a position that is on the body 31 which is less influenced by the deformation of the wings 32, and is evenly away from the two wings 32. In this implementation, the reference position Pc may be located at the top of the substantial middle in the front-rear direction of the airframe, as with the position at which the laser distance measuring devices 15 are disposed in the foregoing first implementation. Further, the vector F from the reference position Pc to the designed position Pd of the tip of the associated wing 32 is a value known as a design value or a drawing value.

Thereafter, the controller 18 may calculate, as a posture vector H of each of the optical cameras 141, an angle (i.e., an orientation) of the tip of the associated wing 32 (step T24). The calculation of the posture vector H may be performed for both of the wings 32.

In step T24, the controller 18 may calculate the angle of the tip of each of the wings 32, i.e., the posture vector H of the associated optical camera 141, on the basis of the displacement amount $\sigma z$ of the tip of the associated wing 32 calculated in step T21 and the wing deformation database 161 read from the storage unit 16, as in step S24 of the stereo distance measuring process in the foregoing first implementation.

Thereafter, the controller 18 may correct the image information acquired in step T1, on the basis of the position vectors G of the respective optical cameras 141 calculated in step T23 and the posture vectors H of the respective optical cameras 141 calculated in step T24 (step T25).

In one specific but non-limiting example, as in step S25 of the stereo distance measuring process in the foregoing first implementation, the controller 18 may calculate a change in position of each of the optical cameras 141 from the designed state, on the basis of the position vector G of the relevant optical camera 141. Further, the controller 18 may calculate a change in posture of each of the optical cameras 141 from the designed state, on the basis of the posture vector H of the relevant optical camera 141. Further, the controller 18 may correct a position and an orientation of an image in the image information taken by the relevant optical camera 141 by the calculated amount of change in position and by the calculated amount of change in posture of the relevant optical camera 141, respectively. The controller 18 may thereby acquire corrected image information.

This may correct the image taken by each of the optical cameras 141 whose position and posture are changed from those in the designed state to an image that should have been taken by the relevant optical camera 141 in the designed state.

Thereafter, as illustrated in FIG. 8A, the controller 18 may utilize, as the stereo image, the pair of pieces of the corrected image information thus acquired, and calculate the distance to the photographing target, as in step S3 of the stereo distance measuring process in the foregoing first implementation (step T3). At this occasion, the controller 18 may refer to the GPS time information associated with each piece of the corrected image information, and select a pair of pieces of corrected image information whose timing of imaging coincide with each other. The situation where "the timing of the imaging coincide with each other" may encompass a situation where a time difference between points in time indicated by the two pieces of the GPS time information falls within a range in which the points in time are regarded as the same point in time. The controller 18 may collate the pair of pieces of the corrected image information, to calculate the distance.

In this way, the distance from the aircraft 30 to the photographing target is appropriately measured, with the stereo image based on the pair of pieces of the corrected image information whose timing of the imaging coincide with each other and in which the changes in the positions and the postures of the respective optical cameras 141 in flight are corrected.

[Effects]

As described, according to the second implementation, effects similar to the effects of the foregoing first implementation are achieved.

Specifically, the images in the pair of pieces of image information taken by the pair of the optical cameras 141 configuring the stereo camera are separately corrected in position and orientation, on the basis of the two pieces of position-posture information, i.e., the position vectors G and the posture vectors H, of the respective optical cameras 141. The two pieces of position-posture information, i.e., the position vectors G and the posture vectors H, of the respective optical cameras 141 are calculated on the basis of the displacement amounts of the two wings 32 on which the pair of optical cameras 141 are disposed. On the basis of the pair of pieces of the corrected image information thus corrected, the distance to the photographing target is calculated.

Accordingly, it is possible to appropriately correct the positions and the orientations of the images, even in a case where the pair of optical cameras 141 are mounted on the aircraft and separated from each other, and the positions and the postures of the optical cameras 141 have changed to different states from one another. Hence, it is possible to restrain the measurement precision from being lowered. Further, it is possible to calculate the position-posture information of the respective optical cameras 141 on the basis of the displacement amounts of the wings 32, without necessity of utilizing the expensive position-posture meter.

Hence, it is possible to enhance the measurement precision of the stereo camera mounted on the aircraft 30 in an inexpensive configuration, as compared to a case where the position-posture meter is utilized.

[Modifications]

It is to be noted that the technology is not limitedly applicable to the foregoing first and second implementations. It should be appreciated that modifications and alterations may be made by persons skilled in the art without departing from the scope as defined by the appended claims.

For example, in the forgoing first and second implementations, the description is given referring to the example in which the displacement amount σz of only the tip of the wing 32 is used to calculate the posture vector of each of the optical cameras 141 with reference to the wing deformation database 161. However, in one specific but non-limiting example, a deformation state (i.e., a warp state) of the wing 32 in a wider range may be detected and utilized to calculate the posture vector.

In this case, in one specific but non-limiting example, the deformation state of the wing 32 in the entire measurement range of the associated laser distance measuring device 15 may be detected by the associated laser distance measuring device 15. In another specific but non-limiting example, the deformation state of the wing 32 as a whole in the span direction may be detected on the basis of the displacement amounts measured by the respective strain gauges 271. In this case, in one specific but non-limiting example, a wing deformation database or a relational expression that describes a relationship between the deformation state of the wing 32 as a whole and the angle of the tip of the wing 32, i.e., the posture vector of the optical camera 141, may be used.

In this way, it is possible to calculate the posture vector of each of the optical cameras 141 more precisely even in a case where a load of a force such as lift on the wing 32 is uneven in the span direction, for example, in a case where the airframe of the aircraft 30 is inclined.

Moreover, in the forgoing first and second implementations, the description is given referring to the example in which the displacement amount of the tip of the wing 32 is calculated on the basis of the designed state utilized as a reference state, and is calculated as a value from the designed position Pd of the tip in the designed state. However, in one specific but non-limiting example, the reference state may be a stopped state in which the aircraft 30 is stopped on the ground. In this case, the position of the tip of the wing 32 in the stopped state of the aircraft 30 may be measured in advance, and the measured position may be used instead of the designed position Pd. However, in the stopped state of the aircraft 30, the tip of the wing 32 warps downward due to its own weight. Therefore, in one specific but non-limiting example where the strain gauge unit 27 is utilized to measure the displacement amount of the wing 32, the strain gauges 271 may be attached to both the upper and lower surfaces of the wing 32.

Moreover, in the forgoing first and second implementations, the description is given referring to the example in which each of the two camera units 14 includes the GPS receiver 142. However, in one specific but non-limiting example, the single GPS receiver 142 common to the two camera units 14 may be provided. In this case, time adjustment may be made in advance between each of the camera units 14, i.e., the optical cameras 141 and the GPS receiver 142, so as to allow the timing of the imaging in the two camera units 14 to coincide with each other.

Moreover, in the foregoing first implementation, the description is given referring to the example in which the laser distance measuring devices 15 are utilized to measure the distances and the directions to the tips of the wings 32. However, instrumentation to be used to measure the distances and the directions to the tips of the wings 32 is not limited to optical instrumentation such as a laser. The measurement of the distances and the directions to the tips of the wings 32 may be performed by other instrumentation as long as the instrumentation is able to perform the measurement with high precision.

Moreover, in the forgoing first and second implementations, the description is given referring to the example in which the pair of the optical cameras 141 are disposed on both the wings 32, i.e., the right wing 32R and the left wing 32L, of the aircraft 30. However, the pair of the optical cameras 141 may be disposed anywhere as long as the pair of the optical cameras 141 are mounted on the aircraft 30 and separated from each other. There is no particular limitation on the positions of the optical cameras 141 on the airframe.

In one implementation described above, the controller 18 illustrated in FIGS. 1 and 6 may be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 18. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the units illustrated in FIGS. 1 and 6.

The implementation also provides a program as the stereo distance measuring program 160 that causes a computer to function as the controller 18, and a recording medium that stores the program. The recording medium is computer readable. Non-limiting examples of the recording medium may include a flexible disk, a magneto-optical disk, ROM, CD, DVD (Registered Trademark) and BD (Registered Trademark). As used herein, the term "program" may refer to a data processor written in any language and any description method.

Although some preferred implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A stereo distance measuring apparatus comprising:
   a first optical camera provided in a first elastic structure part of a first wing of an aircraft and a second optical camera provided in a second elastic structure part of a second wing of the aircraft, the first optical camera and the second optical camera constituting a stereo camera;
   a position-posture calculator configured to calculate 1) first position-posture information regarding a position and a posture of the first optical camera based on a first displacement amount of the first elastic structure part of the first wing and 2) second position-posture information regarding a position and a posture of the second optical camera based on a second displacement amount of the second elastic structure part of the second wing;
   an image corrector configured to 1) generate a first corrected image by correcting, on a basis of the first position-posture information, a position and an orientation of an image taken by the first optical camera, and 2) generate a second corrected image by correcting, on a basis of the second position-posture information, a position and an orientation of an image taken by the second optical camera; and
   a stereo distance measuring unit configured to calculate a distance to a photographing target, on a basis of the first corrected image and the second corrected image, wherein
   the position-posture calculator includes:
      a distance measuring unit that is provided in a highly-rigid part of the aircraft, and configured to measure a distance and a direction from the highly-rigid part to the first optical camera and a distance and a direction from the highly-rigid part to the second optical camera, the highly-rigid part having rigidity that is higher than rigidity of the first elastic structure part and the second elastic structure part;
      a position calculator configured to calculate a first position vector to the first optical camera on a basis of the distance and the direction from the highly-rigid part to the first optical camera, and calculate a second position vector to the second optical camera on a basis of the distance and the direction from the highly-rigid part to the second optical camera;
      a displacement amount calculator configured to calculate, on a basis of the first position vector, the first displacement amount of the first elastic structure part at which the first optical camera is provided, and calculate, on a basis of the second position vector, the second displacement amount of the second elastic structure part at which the second optical camera is provided; and
      a posture calculator configured to calculate a first posture vector of the first optical camera on a basis of the first displacement amount, and calculate a second posture vector of the second optical camera on a basis of the second displacement amount,
      wherein the first position-posture information includes the first position vector and the first posture vector, and
      wherein the second position-posture information includes the second position vector and the second posture vector.

2. The stereo distance measuring apparatus according to claim 1, wherein the first optical camera and the second optical camera are separately provided at respective tips of the first and second wings of the aircraft, and the aircraft has a body provided with the distance measuring unit.

3. The stereo distance measuring apparatus according to claim 2, further comprising a storage that stores in advance one of a database and a relational expression that express a relationship of the first displacement amount of the first elastic structure part at a first position at which the first optical camera is disposed versus an angle of the first position, and a relationship of the second displacement amount of the second elastic structure part at a second position at which the second optical camera is disposed versus an angle of the second position, wherein the posture calculator is configured to calculate the first posture vector of the first optical camera and the second posture vector of the second optical camera by using one of the database and the relational expression that is stored in the storage.

4. The stereo distance measuring apparatus according to claim 1, further comprising a storage that stores in advance one of a database and a relational expression that express a relationship of the first displacement amount of the first elastic structure part at a first position at which the first optical camera is disposed versus an angle of the first position, and a relationship of the second displacement amount of the second elastic structure part at a second position at which the second optical camera is disposed versus an angle of the second position, wherein the posture calculator is configured to calculate the first posture vector of the first optical camera and the second posture vector of the second optical camera by using one of the database and the relational expression that is stored in the storage.

5. A stereo distance measuring apparatus comprising:

a first optical camera provided in a first elastic structure part of a first wing of an aircraft and a second optical camera provided in a second elastic structure part of a second wing of the aircraft, the first optical camera and the second optical camera constituting a stereo camera;

a position-posture calculator configured to calculate 1) first position-posture information regarding a position and a posture of the first optical camera based on a first displacement amount of the first elastic structure part of the first wing and 2) second position-posture information regarding a position and a posture of the second optical camera based on a second displacement amount of the second elastic structure part of the second wing;

an image corrector configured to 1) generate a first corrected image by correcting, on a basis of the first position-posture information, a position and an orientation of an image taken by the first optical camera, and 2) generate a second corrected image by correcting, on a basis of the second position-posture information, a position and an orientation of an image taken by the second optical camera; and a stereo distance measuring unit configured to calculate a distance to a photographing target, on a basis of the first corrected image and the second corrected image, wherein the position-posture calculator includes:

a displacement amount measuring unit configured to measure the first displacement amount of the first elastic structure part at which the first optical camera is provided, and measure the second displacement amount of the second elastic structure part at which the second optical camera is provided; and a position-posture vector calculator configured to calculate a first position vector and a first posture vector of the first optical camera on a basis of the first displacement amount, and calculate a second position vector and a second posture vector of the second optical camera on a basis of the second displacement amount, wherein the first position-posture information includes the first position vector and the first posture vector, and wherein the second position-posture information includes the second position vector and the second posture vector.

6. The stereo distance measuring apparatus according to claim 5, wherein the first optical camera and the second optical camera are separately provided at respective tips of the first and second wings of the aircraft, the first displacement amount includes a displacement amount, in a wing length direction, of the tip at which the first optical camera is provided and a displacement amount, in a wing thickness direction, of the tip at which the first optical camera is provided, the second displacement amount includes a displacement amount, in a wing length direction, of the tip at which the second optical camera is provided and a displacement amount, in a wing thickness direction, of the tip at which the second optical camera is provided, and the position-posture vector calculator includes:

a position calculator configured to calculate the first position vector on a basis of the displacement amount in the wing length direction and the displacement amount in the wing thickness direction that are included in the first displacement amount, and calculate the second position vector on a basis of the displacement amount in the wing length direction and the displacement amount in the wing thickness direction that are included in the second displacement amount; and a posture calculator configured to calculate the first posture vector on a basis of the displacement amount in the wing thickness direction included in the first displacement amount, and calculate the second posture vector on a basis of the displacement amount in the wing thickness direction included in the second displacement amount.

7. The stereo distance measuring apparatus according to claim 6, further comprising a storage that stores in advance one of a database and a relational expression that express a relationship of the first displacement amount of the first elastic structure part at a first position at which the first optical camera is disposed versus an angle of the first position, and a relationship of the second displacement amount of the second elastic structure part at a second position at which the second optical camera is disposed versus an angle of the second position, wherein the posture calculator is configured to calculate the first posture vector of the first optical camera and the second posture vector of the second optical camera by using one of the database and the relational expression that is stored in the storage.

8. A stereo distance measuring method comprising:
calculating, with a stereo distance measuring apparatus including a first optical camera provided in a first elastic structure part of a first wing of an aircraft and a second optical camera provided in a second elastic structure part of a second wing of the aircraft, 1) first position-posture information regarding a position and a posture of the first optical camera based on a first displacement amount of the first elastic structure part and 2) second position-posture information regarding a position and a posture of the second optical camera based on a second displacement amount of the second elastic structure part, the first optical camera and the second optical camera constituting a stereo camera;
generating, with the stereo distance measuring apparatus, a first corrected image by correcting, on a basis of the first position-posture information, a position and an orientation of an image taken by the first optical camera, and a second corrected image by correcting, on a basis of the second position-posture information, a position and an orientation of an image taken by the second optical camera;
calculating, with the stereo distance measuring apparatus, a distance to a photographing target, on a basis of the first corrected image and the second corrected image;
measuring a distance and a direction from a highly-rigid part to the first optical camera and a distance and a direction from a highly-rigid part to the second optical camera, the highly-rigid part having rigidity that is higher than rigidity of the first elastic structure part and the second elastic structure part;
calculating a first position vector to the first optical camera on a basis of the distance and the direction from the highly-rigid part to the first optical camera, and calculate a second position vector to the second optical camera on a basis of the distance and the direction from the highly-rigid part to the second optical camera;
calculating, on a basis of the first position vector, the first displacement amount of the first elastic structure part at which the first optical camera is provided, and calculate, on a basis of the second position vector, the second displacement amount of the second elastic structure part at which the second optical camera is provided; and
calculating a first posture vector of the first optical camera on a basis of the first displacement amount, and calculate a second posture vector of the second optical camera on a basis of the second displacement amount,
wherein the first position-posture information includes the first position vector and the first posture vector, and
wherein the second position-posture information includes the second position vector and the second posture vector.

9. A non-transitory computer readable medium having a stereo distance measuring program causing a computer to implement a method, the method comprising:
calculating, with a stereo distance measuring apparatus including a first optical camera provided in a first elastic structure part of a first wing of an aircraft and a second optical camera provided in a second elastic structure part of a second wing of the aircraft, 1) first position-posture information regarding a position and a posture of the first optical camera based on a first displacement amount of the first elastic structure part and 2) second position-posture information regarding a position and a posture of the second optical camera based on a second displacement amount of the second elastic structure part, the first optical camera and the second optical camera constituting a stereo camera;
generating, with the stereo distance measuring apparatus, a first corrected image by correcting, on a basis of the first position-posture information, a position and an orientation of an image taken by the first optical camera, and a second corrected image by correcting, on a basis of the second position-posture information, a position and an orientation of an image taken by the second optical camera; and
calculating, with the stereo distance measuring apparatus, a distance to a photographing target, on a basis of the first corrected image and the second corrected image;
measuring a distance and a direction from a highly-rigid part to the first optical camera and a distance and a direction from a highly-rigid part to the second optical camera, the highly-rigid part having rigidity that is higher than rigidity of the first elastic structure part and the second elastic structure part;
calculating a first position vector to the first optical camera on a basis of the distance and the direction from the highly-rigid part to the first optical camera, and calculate a second position vector to the second optical camera on a basis of the distance and the direction from the highly-rigid part to the second optical camera;
calculating, on a basis of the first position vector, the first displacement amount of the first elastic structure part at which the first optical camera is provided, and calculate, on a basis of the second position vector, the second displacement amount of the second elastic structure part at which the second optical camera is provided; and
calculating a first posture vector of the first optical camera on a basis of the first displacement amount, and calculate a second posture vector of the second optical camera on a basis of the second displacement amount,
wherein the first position-posture information includes the first position vector and the first posture vector, and
wherein the second position-posture information includes the second position vector and the second posture vector.

10. A stereo distance measuring apparatus comprising:
a first optical camera provided in a first elastic structure part of a first wing of an aircraft and a second optical camera provided in a second elastic structure part of a second wing of the aircraft, the first optical camera and the second optical camera constituting a stereo camera;
a distance measuring unit that is provided in a highly-rigid part of the aircraft, and configured to measure a first distance and a first direction from the highly-rigid part to the first optical camera and a second distance and a second direction from the highly-rigid part to the second optical camera, the highly-rigid part having rigidity that is higher than rigidity of the elastic structure part; and
circuitry configured to
calculate, on a basis of the first distance and the first direction from the highly-rigid part to the first optical camera, first position-posture information regarding a position and a posture of the first optical camera, and calculate, on a basis of the second distance and the second direction from the highly-rigid part to the second optical camera, second position-posture information regarding a position and a posture of the second optical camera,
generate a first corrected image by correcting, on a basis of the first position-posture information, a position and an orientation of an image taken by the first optical camera, and generate a second corrected image by correcting, on a basis of the second position-posture information, a position and an orientation of an image taken by the second optical camera, calculate a distance to a photographing target, on a basis of the first corrected image and the second corrected image, measure a distance and a direction from a highly-rigid part to the first optical camera and a distance and a direction from a highly-rigid part to the second optical camera, the highly-rigid part having rigidity that is higher than rigidity of the first elastic structure part and the second elastic structure part, calculate a first position vector to the first optical camera on a basis of the distance and the direction from the highly-rigid part to the first optical camera, and calculate a second position vector to the second optical camera on a basis of the distance and the direction from the highly-rigid part to the second optical camera, calculate, on a basis of the first position vector, a first displacement amount of the first elastic structure part at which the first optical camera is provided, and calculate, on a basis of the second position vector, a second displacement amount of the second elastic structure part at which the second optical camera is provided, and calculate a first posture vector of the first optical camera on a basis of the first displacement amount, and calculate a second posture vector of the second optical camera on a basis of the second displacement amount, wherein the first position-posture information includes the first position vector and the first posture vector, and wherein the second position-posture information includes the second position vector and the second posture vector.

11. A stereo distance measuring apparatus comprising:

a first optical camera provided in a first elastic structure part of a first wing of an aircraft and a second optical camera provided in a second elastic structure part of a second wing of the aircraft, the first optical camera and the second optical camera constituting a stereo camera;

a displacement amount measuring unit configured to measure a first displacement amount of the first elastic structure part at which the first optical camera is provided, and measure a second displacement amount of the second elastic structure part at which the second optical camera is provided; and circuitry configured to calculate, on a basis of the first displacement amount, first position-posture information regarding a position and a posture of the first optical camera, calculate, on a basis of the second displacement amount, second position-posture information regarding a position and a posture of the second optical camera, generate a first corrected image by correcting, on a basis of the first position-posture information, a position and an orientation of an image taken by the first optical camera, generate a second corrected image by correcting, on a basis of the second position-posture information, a position and an orientation of an image taken by the second optical camera, calculate a distance to a photographing target, on a basis of the first corrected image and the second corrected image, measure a distance and a direction from a highly-rigid part to the first optical camera and a distance and a direction from a highly-rigid part to the second optical camera, the highly-rigid part having rigidity that is higher than rigidity of the first elastic structure part and the second elastic structure part, calculate a first position vector to the first optical camera on a basis of the distance and the direction from the highly-rigid part to the first optical camera, and calculate a second position vector to the second optical camera on a basis of the distance and the direction from the highly-rigid part to the second optical camera, calculate, on a basis of the first position vector, the first displacement amount of the first elastic structure part at which the first optical camera is provided, and calculate, on a basis of the second position vector, the second displacement amount of the second elastic structure part at which the second optical camera is provided, and calculate a first posture vector of the first optical camera on a basis of the first displacement amount, and calculate a second posture vector of the second optical camera on a basis of the second displacement amount, wherein the first position-posture information includes the first position vector and the first posture vector, and wherein the second position-posture information includes the second position vector and the second posture vector.

* * * * *